(12) United States Patent
Boncyk et al.

(10) Patent No.: US 7,881,529 B2
(45) Date of Patent: *Feb. 1, 2011

(54) DATA CAPTURE AND IDENTIFICATION SYSTEM AND PROCESS

(75) Inventors: Wayne C Boncyk, Fontana, CA (US); Ronald H Cohen, Pasadena, CA (US)

(73) Assignee: Evryx Technologies, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/505,714

(22) Filed: Jul. 20, 2009

(65) Prior Publication Data

US 2010/0011058 A1  Jan. 14, 2010

Related U.S. Application Data

(63) Continuation of application No. 11/342,094, filed on Jan. 26, 2006, now Pat. No. 7,565,008, which is a continuation-in-part of application No. 09/992,942, filed on Nov. 5, 2001, now Pat. No. 7,016,532.

(60) Provisional application No. 60/317,521, filed on Sep. 5, 2001, provisional application No. 60/246,295, filed on Nov. 6, 2000.

(51) Int. Cl.
*G06K 9/00* (2006.01)

(52) U.S. Cl. .................................................. 382/165

(58) Field of Classification Search ......... 382/115–118, 382/162, 165, 170, 100, 181, 305, 224, 218; 348/239, 14.1–14.16, 211.2–211.6, 207.1, 348/460, 552; 707/1–7, 104.1; 705/26–27, 705/23; 455/414.2, 456.3, 556.1, 412.1, 455/556.2, 419; 709/201–203, 217–219, 709/250
See application file for complete search history.

(56) References Cited

U.S. PATENT DOCUMENTS

| | | | |
|---|---|---|---|
| 6,522,889 B1 | 2/2003 | Aarnio | |
| 6,674,993 B1 | 1/2004 | Tarbouriech | |
| 6,724,914 B2 | 4/2004 | Brundage et al. | |
| 7,016,532 B2 * | 3/2006 | Boncyk et al. ............... | 382/165 |
| 2002/0019819 A1 | 2/2002 | Sekiguchi et al. | |
| 2003/0095681 A1 | 5/2003 | Burg et al. | |
| 2005/0015370 A1 | 1/2005 | Stavely et al. | |
| 2005/0185060 A1 | 8/2005 | Neven | |
| 2008/0021953 A1 | 1/2008 | Gil | |

* cited by examiner

*Primary Examiner*—Sherali Ishrat
(74) *Attorney, Agent, or Firm*—Fish & Associates, PC

(57) ABSTRACT

An identification method and process for objects from digitally captured images thereof that uses data characteristics to identify an object from a plurality of objects in a database. The data is broken down into parameters such as a Shape Comparison, Grayscale Comparison, Wavelet Comparison, and Color Cube Comparison with object data in one or more databases to identify the actual object of a digital image.

27 Claims, 4 Drawing Sheets

DATA CAPTURE AND IDENTIFICATION SYSTEM AND PROCESS

This application is a Continuation of U.S. application Ser. No. 11/342,094 filed Jan. 26, 2006 now U.S. Pat. No. 7,565,008, which is a CIP of U.S. application Ser. No. 09/992,942 filed Nov. 5, 2001 now U.S. Pat. No. 7,016,532, which claims priority to U.S. Provisional Application No. 60/317,521 filed Sep. 5, 2001, and U.S. Provisional Application No. 60/246,295 filed Nov. 6, 2000. These and all other extrinsic references are incorporated herein by reference in their entirety. Where a definition or use of a term in an incorporated reference is inconsistent or contrary to the definition of that term provided herein, the definition of that term provided herein applies and the definition of that term in the reference does not apply.

This application is a continuation-in-part of U.S. application Ser. No. 09/992,942 filed Nov. 5, 2001 which claims the benefit of U.S. Provisional Application No. 60/317,521 filed on Sep. 5, 2001 and U.S. Provisional Application No. 60/246,295 filed on Nov. 6, 2000.

FIELD OF THE INVENTION

The invention relates an identification method and process for objects from digitally captured images thereof that uses data characteristics to identify an object from a plurality of objects in a database.

BACKGROUND OF THE INVENTION

There is a need to identify an object that has been digitally captured from a database of images without requiring modification or disfiguring of the object. Examples include:

identifying pictures or other art in a large museum, where it is desired to provide additional information about objects in the museum by means of a mobile display so that the museum may display objects of interest in the museum and ensure that displays are not hidden or crowded out by signs or computer screens;

establishing a communications link with a machine by merely taking a visual data of the machine; and calculating the position and orientation of an object based on the appearance of the object in a data despite shadows, reflections, partial obscuration, and variations in viewing geometry, or other obstructions to obtaining a complete image. Data capture hardware such as a portable telephones with digital cameras included are now coming on the market and it is desirable that they be useful for duties other than picture taking for transmission to a remote location. It is also desirable that any identification system uses available computing power efficiently so that the computing required for such identification can be performed locally, shared with an Internet connected computer or performed remotely, depending on the database size and the available computing power. In addition, it is desirable that any such identification system can use existing identification markings such as barcodes, special targets, or written language when such is available to speed up searches and data information retrieval.

SUMMARY OF THE INVENTION

The present invention solves the above stated needs. Once a data is captured digitally, a search of the data determines whether symbolic content is included in the image. If so the symbol is decoded and communication is opened with the proper database, usually using the Internet, wherein the best match for the symbol is returned. In some instances, a symbol may be detected, but non-ambiguous identification is not possible. In that case and when a symbolic data can not be detected, the data is decomposed through identification algorithms where unique characteristics of the data are determined. These characteristics are then used to provide the best match or matches in the data-base, the "best" determination being assisted by the partial symbolic information, if that is available.

Therefore the present invention provides technology and processes that can accommodate linking objects and images to information via a network such as the Internet, which requires no modification to the linked object. Traditional methods for linking objects to digital information, including applying a barcode, radio or optical transceiver or transmitter, or some other means of identification to the object, or modifying the data or object so as to encode detectable information in it, are not required because the data or object can be identified solely by its visual appearance. The users or devices may even interact with objects by "linking" to them. For example, a user may link to a vending machine by "pointing and clicking" on it. His device would be connected over the Internet to the company that owns the vending machine. The company would in turn establish a connection to the vending machine, and thus the user would have a communication channel established with the vending machine and could interact with it.

The decomposition algorithms of the present invention allow fast and reliable detection and recognition of images and/or objects based on their visual appearance in an image, no matter whether shadows, reflections, partial obscuration, and variations in viewing geometry are present. As stated above, the present invention also can detect, decode, and identify images and objects based on traditional symbols which may appear on the object, such as alphanumeric characters, barcodes, or 2-dimensional matrix codes.

When a particular object is identified, the position and orientation of an object with respect to the user at the time the data was captured can be determined based on the appearance of the object in an image. This can be the location and/or identity of people scanned by multiple cameras in a security system, a passive locator system more accurate than GPS or usable in areas where GPS signals cannot be received, the location of specific vehicles without requiring a transmission from the vehicle, and many other uses.

When the present invention is incorporated into a mobile device, such as a portable telephone, the user of the device can link to images and objects in his or her environment by pointing the device at the object of interest, then "pointing and clicking" to capture an image. Thereafter, the device transmits the data to another computer ("Server"), wherein the data is analyzed and the object or data of interest is detected and recognized. Then the network address of information corresponding to that object is transmitted from the ("Server") back to the mobile device, allowing the mobile device to access information using the network address so that only a portion of the information concerning the object needs to be stored in the systems database.

Some or all of the data processing, including image/object detection and/or decoding of symbols detected in the data, may be distributed arbitrarily between the mobile (Client) device and the Server. In other words, some processing may be performed in the Client device and some in the Server. Additionally the processing may be performed without specification of which particular processing is performed in each. However all processing may be performed on one platform or the other, or the platforms may be combined so that there is only one platform. The data processing can be implemented in a parallel computing manner, thus facilitating scaling of the system with respect to database size and input traffic loading.

Therefore, it is an object of the present invention to provide a system and process for identifying digitally captured images without requiring modification to the object.

Another object is to use digital capture devices in ways never contemplated by their manufacturer.

Another object is to allow identification of objects from partial views of the object.

Another object is to provide communication means with operative devices without requiring a public connection therewith.

Another object is to allow the telephony device to transmit information and data derived from the captured data to the server.

Still another object of the invention is to provide a telephony device that may transmit motion imagery to the server.

Another object is to provide a communication means wherein the telephony device may transmit information/data derived from the data to the server, as opposed to transmitting the data itself.

Yet another object of the present invention is to allow the telephony device to transmit either motion imagery and/or still images to the server.

Another object of the present invention is to allow the server to send an item of information to another distal device.

Yet another object of the present invention is to allow the system to perform data processing, data contrast enhancement, noise removal and de-blurring thereof.

Yet another object of the present invention is to allow the system to perform data processing prior to the recognition and/or search process.

Still another object of the present invention is to allow the system to perform data processing even if the data recognition and/or search process fails.

Another object of the present invention is to allow the system to perform data processing after a prior data recognition and/or search process fails.

These and other objects and advantages of the present invention will become apparent to those skilled in the art after considering the following detailed specification, together with the accompanying drawings wherein:

DETAILED DESCRIPTION OF THE PREFERRED EMBODIMENTS

The present invention includes a novel process whereby information such as Internet content is presented to a users based solely on a remotely acquired data of a physical object. Although coded information can be included in the remotely acquired image, it is not required since no additional information about a physical object, other than its image, needs to be encoded in the linked object. There is no need for any additional code or device, radio, optical or otherwise, to be embedded in or affixed to the object. Image-linked objects can be located and identified within user-acquired imagery solely by means of digital data processing, with the address of pertinent information being returned to the device used to acquire the data and perform the link. This process is robust against digital data noise and corruption (as can result from lossy data compression/decompression), perspective error, rotation, translation, scale differences, illumination variations caused by different lighting sources, and partial obscuration of the target that results from shadowing, reflection or blockage.

Figure 1:
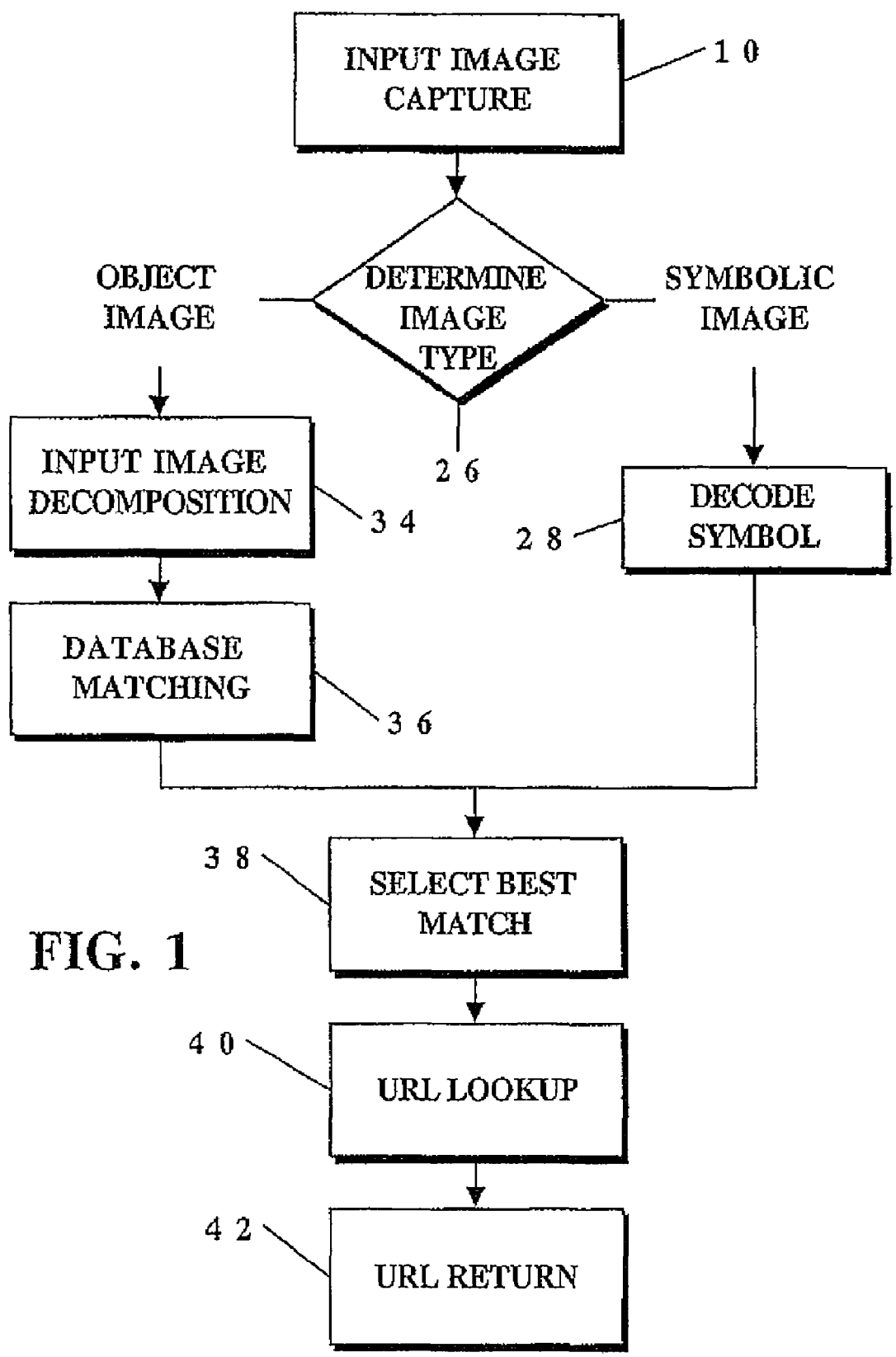
FIG. 1 is a schematic block diagram top-level algorithm flowchart.

Many different variations on machine vision "target location and identification" exist in the current art. However, they all tend to provide optimal solutions for an arbitrarily restricted search space. At the heart of the present invention is a high-speed data matching engine that returns unambiguous matches to target objects contained in a wide variety of potential input images. This unique approach to data matching takes advantage of the fact that at least some portion of the target object will be found in the user-acquired image. Additionally, another unique approach is to allow for data processing by either the capturing device or the server prior to identification and transmission. The parallel data comparison processes embodied in the present search technique are, when taken together, unique to the process. Further, additional refinement of the process, with the inclusion of more and/or different decomposition-parameterization functions, utilized within the overall structure of the search loops is not restricted. The detailed process is described in the following FIG. 1 showing the overall processing flow and steps. These steps are described in further detail in the following sections.

Figure 2:
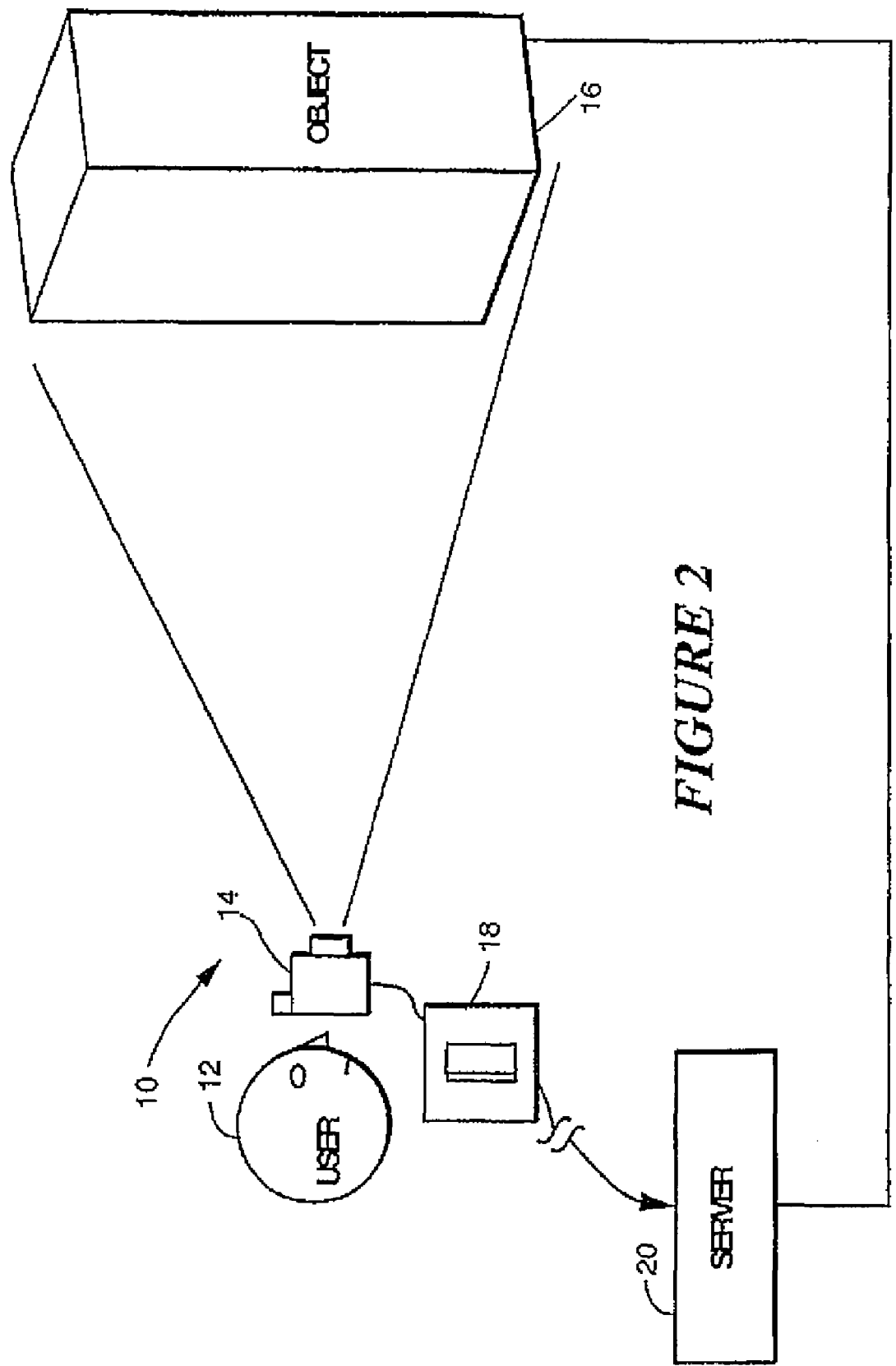
FIG. 2 is an idealized view of data capture.

For data capture 10, the User 12 (FIG. 2) utilizes a computer, mobile telephone, personal digital assistant, or other similar device 14 equipped with a data sensor (such as a CCD or CMOS digital camera). The User 12 aligns the sensor of the data capture device 14 with the object 16 of interest. The linking process is then initiated by suitable means including: the User 12 pressing a button on the device 14 or sensor; by the software in the device 14 automatically recognizing that a data is to be acquired; by User voice command; or by any other appropriate means. The device 14 captures a digital data 18 of the scene at which it is pointed. This data 18 is represented as three separate 2-D matrices of pixels, corresponding to the raw RGB (Red, Green, Blue) representation of the input image. For the purposes of standardizing the analytical processes in this embodiment, if the device 14 supplies a data in other than RGB format, a transformation to RGB is accomplished. These analyses could be carried out in any standard color format, should the need arise.

If the Data/Server 20 is physically separate from the device 14, then user acquired images are transmitted from the device 14 to the Data/Server 20 using a conventional digital network or wireless network means. However, prior to transmitting the data to the data/server 20, the device 14 used to capture the data may first conduct data processing, such as contrast enhancement, noise removal, de-blurring and the like. This procedure of data processing may be done prior to transmission of the data to the data/server 20, or after search results have been returned to the device 14.

If the data 18 has been compressed (e.g. via lossy JPEG DCT) in a manner that introduces compression artifacts into the reconstructed data 18, these artifacts may be partially removed by, for example, applying a conventional despeckle filter to the reconstructed data prior to additional processing. Additionally, the device 14 may transmit motion imagery, such as, for example, video transmissions. The motion imagery may be transferred to the server instead of; or in conjunction with one or more still images.

The Data Type Determination 26 is accomplished with a discriminator algorithm which operates on the input data 18 and determines whether the input data contains recognizable symbols, such as barcodes, matrix codes, or alphanumeric characters. If such symbols are found, the data 18 is sent to the Decode Symbol 28 process. Depending on the confidence level with which the discriminator algorithm finds the symbols, the data 18 also may or alternatively contain an object of interest and may therefore also or alternatively be sent to the Object Data branch of the process flow. For example, if an input data 18 contains both a barcode and an object, depending on the clarity with which the barcode is detected, the data may be analyzed by both the Object Data and Symbolic Data branches, and that branch which has the highest success in identification will be used to identify and link from the object.

The data may be analyzed to determine the location, size, and nature of the symbols in the Decode Symbol 28. The symbols are analyzed according to their type, and their content information is extracted. For example, barcodes and alphanumeric characters will result in numerical and/or text information.

For object images, the present invention performs a "decomposition", in the Input Data Decomposition 34, of a high-resolution input data into several different types of quantifiable salient parameters. This allows for multiple independent convergent search processes of the database to occur in parallel, which greatly improves data match speed and match robustness in the Database Matching 36. As illustrated above, a portion of the decomposition may be divided arbitrarily between the device 14 and the server 20. The Best Match 38 from either the Decode Symbol 28, or the data Database Matching 36, or both, is then determined. If a specific URL (or other online address) is associated with the image, then an URL Lookup 40 is performed and the Internet address is returned by the URL Return 42. Additionally, during processing, the server may send an item of information to another distal device (not shown). For example, if an data of a TV listing in a magazine is transmitted to the server 20, the server may recognize the data as a TV listing wherein the server 20 may send a command to a Internet-connected television to change to the channel in the listing.

The overall flow of the Input Data Decomposition process is as follows:
Radiometric Correction
Segmentation
Segment Group Generation
FOR each segment group
Bounding Box Generation
Geometric Normalization
Wavelet Decomposition
Color Cube Decomposition
Shape Decomposition
Low-Resolution Grayscale Image Generation
FOR END Each of the above steps is explained in further detail below. For Radiometric Correction, the input image typically is transformed to an 8-bit per color plane, RGB representation. The RGB image is radiometrically normalized in all three channels. This normalization is accomplished by linear gain and offset transformations that result in the pixel values within each color channel spanning a full 8-bit dynamic range (256 possible discrete values). An 8-bit dynamic range is adequate but, of course, as optical capture devices produce higher resolution images and computers get faster and memory gets cheaper, higher bit dynamic ranges, such as 16-bit, 32-bit or more may be used.

For Segmentation, the radiometrically normalized RGB image is analyzed for "segments," or regions of similar color, i.e. near equal pixel values for red, green, and blue. These segments are defined by their boundaries, which consist of sets of (x, y) point pairs. A map of segment boundaries is produced, which is maintained separately from the KGB input image and is formatted as an x, y binary image map of the same aspect ratio as the RGB image.

For Segment Group Generation, the segments are grouped into all possible combinations. These groups are known as "segment groups" and represent all possible potential images or objects of interest in the input image. The segment groups are sorted based on the order in which they will be evaluated. Various evaluation order schemes are possible. The particular embodiment explained herein utilizes the following "center-out" scheme: The first segment group comprises only the segment that includes the center of the image. The next segment group comprises the previous segment plus the segment which is the largest (in number of pixels) and which is adjacent to (touching) the previous segment group. Additional segments are added using the segment criteria above until no segments remain. Each step, in which a new segment is added, creates a new and unique segment group.

For Bounding Box Generation, the elliptical major axis of the segment group under consideration (the major axis of an ellipse just large enough to contain the entire segment group) is computed. Then a rectangle is constructed within the image coordinate system, with long sides parallel to the elliptical major axis, of a size just large enough to completely contain every pixel in the segment group.

For Geometric Normalization, a copy of the input image is modified such that all pixels not included in the segment group under consideration are set to mid-level gray. The result is then resampled and mapped into a "standard aspect" output test image space such that the corners of the bounding box are mapped into the corners of the output test image. The standard aspect is the same size and aspect ratio as the Reference images used to create the database.

For Wavelet Decomposition, a grayscale representation of the full-color image is produced from the geometrically normalized image that resulted from the Geometric Normalization step. The following procedure is used to derive the grayscale representation. Reduce the three color planes into one grayscale image by proportionately adding each R, G, and B pixel of the standard corrected color image using the following formula:

$$L_{x,y} = 0.34 \cdot R_{x,y} + 0.55 \cdot G_{x,y} + 0.11 \cdot B_{x,y}$$

then round to nearest integer value. Truncate at 0 and 255, if necessary. The resulting matrix L is a standard grayscale image. This grayscale representation is at the same spatial resolution as the full color image, with an 8-bit dynamic range. A multi-resolution Wavelet Decomposition of the grayscale image is performed, yielding wavelet coefficients for several scale factors. The Wavelet coefficients at various scales are ranked according to their weight within the image.

For Color Cube Decomposition, an image segmentation is performed (see "Segmentation" above), on the RGB image that results from Geometric Normalization. Then the RGB image is transformed to a normalized Intensity, In-phase and Quadrature-phase color image (YIQ). The segment map is used to identify the principal color regions of the image, since each segment boundary encloses pixels of similar color. The average Y, I, and Q values of each segment, and their individual component standard deviations, are computed. The following set of parameters result, representing the colors, color variation, and size for each segment:

$Y_{avg}$=Average Intensity
$I_{avg}$=Average In-phase
$Q_{avg}$=Average Quadrature Y.sub.sigma=Intensity standard deviation I.sub.sigma=In-phase standard deviation Q.sub.sigma=Quadrature standard deviation N.sub.pixels=number of pixels in the segment The parameters comprise a representation of the color intensity and variation in each segment. When taken together for all segments in a segment group, these parameters comprise points (or more accurately, regions, if the standard deviations are taken into account) in a three-dimensional color space and describe the intensity and variation of color in the segment group.

For Shape Decomposition, the map resulting from the segmentation performed in the Color Cube Generation step is used and the segment group is evaluated to extract the group outer edge boundary, the total area enclosed by the boundary, and its area centroid. Additionally, the net ellipticity (semi-major axis divided by semi-minor axis of the closest fit ellipse to the group) is determined.

For Low-Resolution Grayscale Image Generation, the full-resolution grayscale representation of the image that was derived in the Wavelet Generation step is now subsampled by a factor in both x and y directions. For the example of this embodiment, a 3:1 subsampling is assumed. The subsampled image is produced by weighted averaging of pixels within each 3.times.3 cell. The result is contrast binned, by reducing the number of discrete values assignable to each pixel based upon substituting a "binned average" value for all pixels that fall within a discrete (TBD) number of brightness bins.

The above discussion of the particular decomposition methods incorporated into this embodiment are not intended to indicate that more, or alternate, decomposition methods may not also be employed within the context of this invention.

In other words:

FOR each input image segment group FOR each database object FOR each view of this object FOR each segment group in this view of this database object Shape Comparison Grayscale Comparison Wavelet Comparison Color Cube Comparison Calculate Combined Match Score END FOR END FOR END FOR END FOR Each of the above steps is explained in further detail below.

FOR Each Input Image Segment Group

This loop considers each combination of segment groups in the input image, in the order in which they were sorted in the "Segment Group Generation" step. Each segment group, as it is considered, is a candidate for the object of interest in the image, and it is compared against database objects using various tests.

One favored implementation, of many possible, for the order in which the segment groups are considered within this loop is the "center-out" approach mentioned previously in the "Segment Group Generation" section. This scheme considers segment groups in a sequence that represents the addition of adjacent segments to the group, starting at the center of the image. In this scheme, each new group that is considered comprises the previous group plus one additional adjacent image segment. The new group is compared against the database. If the new group results in a higher database matching score than the previous group, then new group is retained. If the new group has a lower matching score then the previous group, then it is discarded and the loop starts again. If a particular segment group results in a match score which is extremely high, then this is considered to be an exact match and no further searching is warranted; in this case the current group and matching database group are selected as the match and this loop is exited.

FOR Each Database Object

This loop considers each object in the database for comparison against the current input segment group.

FOR Each View Of This Object

This loop considers each view of the current database object for comparison against the current input segment group. The database contains, for each object, multiple views from different viewing angles.

FOR Each Segment Group In This View Of This Database Object

This loop considers each combination of segment groups in the current view of the database object. These segment groups were created in the same manner as the input image segment groups.

Shape Comparison

Inputs

For the input image and all database images:

I. Segment group outline

I. Segment group area

III. Segment group centroid location

IV. Segment group bounding ellipse ellipticity

Algorithm

V. Identify those database segment groups with an area approximately equal to that of the input segment group, within TBD limits, and calculate an area matching score for each of these "matches."

VI. Within the set of matches identified in the previous step, identify those database segment groups with an ellipticity approximately equal to that of the input segment group, within TBD limits, and calculate an ellipticity position matching score for each of these "matches."

VII. Within the set of matches identified in the previous step, identify those database segment groups with a centroid position approximately equal to that of the input segment group, within TBD limits, and calculate a centroid position matching score for each of these "matches."

VIII. Within the set of matches identified in the previous step, identify those database segment groups with an outline shape approximately equal to that of the input segment group, within TBD limits, and calculate an outline matching score for each of these "matches." This is done by comparing the two outlines and analytically determining the extent to which they match.

Note: this algorithm need not necessarily be performed in the order of Steps 1 to 4. It could alternatively proceed as follows:

2 FOR each database segment group IF the group passes Step 1 IF the group passes Step 2 IF the group passes Step 3 IF the group passes Step 4 Successful comparison, save result END IF END IF END IF END IF END FOR Grayscale Comparison Inputs For the input image and all database images:

IX. Low-resolution, normalized, contrast-binned, grayscale image of pixels within segment group bounding box, with pixels outside of the segment group set to a standard background color.

Algorithm

Given a series of concentric rectangular "tiers" of pixels within the low-resolution images, compare the input image pixel values to those of all database images, calculate a matching score for each comparison and identify those database images with matching scores within TBD limits, as follows:

FOR each database image

FOR each tier, starting with the innermost and progressing to the outermost

Compare the pixel values between the input and database image

Calculate an aggregate matching score IF matching score is greater than some TBD limit (i.e., close match)

3 Successful comparison, save result END IF END FOR END FOR

Wavelet Comparison

Inputs

For the input image and all database images:

X. Wavelet coefficients from high-resolution grayscale image within segment group bounding box.

Algorithm

Successively compare the wavelet coefficients of the input segment group image and each database segment group image, starting with the lowest-order coefficients and progressing to the highest order coefficients. For each comparison, compute a matching score. For each new coefficient, only consider those database groups that had matching scores, at the previous (next lower order) coefficient within TBD limits.

4 FOR each database image IF input image $C_0$ equals database image $C_0$ within TBD limit IF input image $C_1$ equals database image $C_1$ within TBD limit . . . IF input image $C_N$ equals database image $C_N$ within TBD limit Close match, save result and match score END IF . . . END IF END IF END FOR Notes: I. "$C_1$" are the wavelet coefficients, with $C_0$ being the lowest order coefficient and $C_N$ being the highest. II. When the coefficients are compared, they are actually compared on a statistical (e.g. Gaussian) basis, rather than an arithmetic difference. III. Data indexing techniques are used to allow direct fast access to database images according to their $C_i$ values. This allows the algorithm to successively narrow the portions of the database of interest as it proceeds from the lowest order terms to the highest.

Color Cube Comparison

Inputs

[$Y_{avg}$, $I_{avg}$, $Q_{avg}$, $Y_{sigma}$, $I_{sigma}$, $Q_{sigma}$, Npixels] data sets ("Color Cube Points") for each segment in:

I. The input segment group image

II. Each database segment group image

Algorithm

5 FOR each database image FOR each segment group in the database image FOR each Color Cube Point in database segment group, in order of descending N pixels value IF Gaussian match between input (Y,I,Q) and database (Y,I,Q) I. Calculate match score for this segment II. Accumulate segment match score into aggregate match score for segment group III. IF aggregate matching score is greater than some TBD limit (i.e., close match) Successful comparison, save result END IF END FOR END FOR END FOR Notes: I. The size of the Gaussian envelope about any Y, I, Q point is determined by RSS of standard deviations of Y, I, and Q for that point.

Calculate Combined Match Score

The four Object Image comparisons (Shape Comparison, Grayscale Comparison, Wavelet Comparison, Color Cube Comparison) each return a normalized matching score. These are independent assessments of the match of salient features of the input image to database images. To minimize the effect of uncertainties in any single comparison process, and to thus minimize the likelihood of returning a false match, the following root sum of squares relationship is used to combine the results of the individual comparisons into a combined match score for an image:

$CurrentMatch = SQRT(W_{OCM}.M_{OC}^2 + W_{CCM}.M_{CCC}^2 + W_{WCM}.M_{WC}^2 + W_{SGCM}.M_{SGC}^2)$, where Ws are TBD parameter weighting coefficients and Ms are the individual match scores of the four different comparisons.

The unique database search methodology and subsequent object match scoring criteria are novel aspects of the present invention that deserve special attention. Each decomposition of the Reference image and Input image regions represent an independent characterization of salient characteristics of the image. The Wavelet Decomposition, Color Cube Decomposition, Shape Decomposition, and evaluation of a sub-sampled low-resolution Grayscale representation of an input image all produce sets of parameters that describe the image in independent ways. Once all four of these processes are completed on the image to be tested, the parameters provided by each characterization are compared to the results of identical characterizations of the Reference images, which have been previously calculated and stored in the database. These comparisons, or searches, are carried out in parallel. The result of each search is a numerical score that is a weighted measure of the number of salient characteristics that "match" (i.e. that are statistically equivalent). Near equivalencies are also noted, and are counted in the cumulative score, but at a significantly reduced weighting.

One novel aspect of the database search methodology in the present invention is that not only are these independent searches carried out in parallel, but also, all but the low-resolution grayscale compares are "convergent." By convergent, it is meant that input image parameters are searched sequentially over increasingly smaller subsets of the entire database. The parameter carrying greatest weight from the input image is compared first to find statistical matches and near-matches in all database records. A normalized interim score (e.g., scaled value from zero to one, where one is perfect match and zero is no match) is computed based on the results of this comparison. The next heaviest weighted parameter from the input image characterization is then searched on only those database records having initial interim scores above a minimum acceptable threshold value. This results in an incremental score that is incorporated into the interim score in a cumulative fashion. Then, subsequent comparisons of increasingly lesser-weighted parameters are assessed only on those database records that have cumulative interim scores above the same minimum acceptable threshold value in the previous accumulated set of tests.

This search technique results in quick completion of robust matches, establishes limits on the domain of database elements that will be compared in a subsequent combined match calculation and therefore speeds up the process. The convergent nature of the search in these comparisons yields a ranked subset of the entire database.

The result of each of these database comparisons is a ranking of the match quality of each image, as a function of decomposition search technique. Only those images with final cumulative scores above the acceptable match threshold will be assessed in the next step, a Combined Match Score evaluation.

Four database comparison processes, Shape Comparison, Grayscale Comparison, Wavelet Comparison, and Color Cube Comparison, are performed. These processes may occur sequentially, but generally are preferably performed in parallel on a parallel computing platform. Each comparison technique searches the entire image database and returns those images that provide the best matches for the particular algorithm, along with the matching scores for these images. These comparison algorithms are performed on segment groups, with each input image segment group being compared to each segment group for each database image.

Figure 3A:
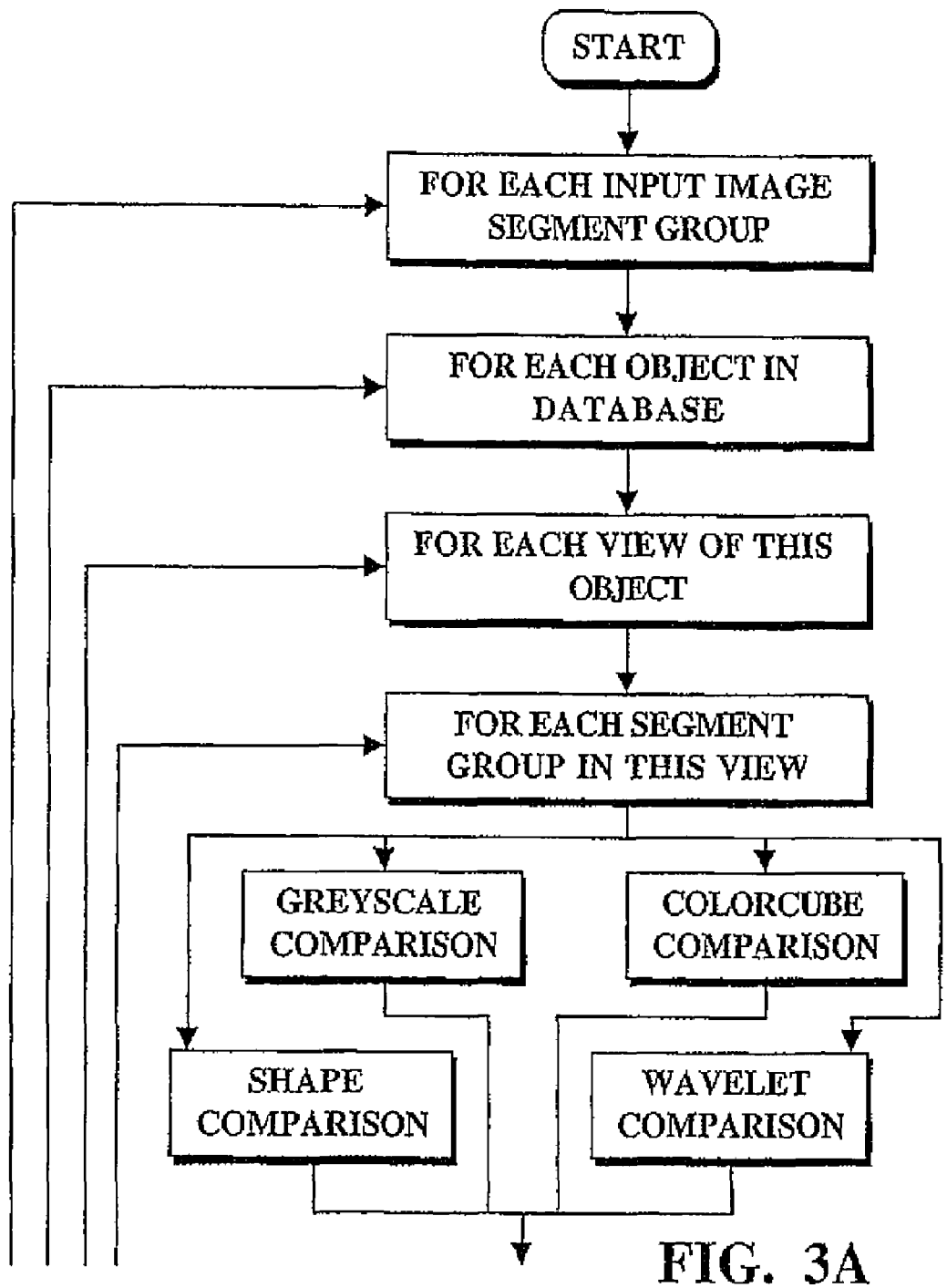
FIGS. 3A and 3B are a schematic block diagram of process details of the present invention.
Figure 3B:
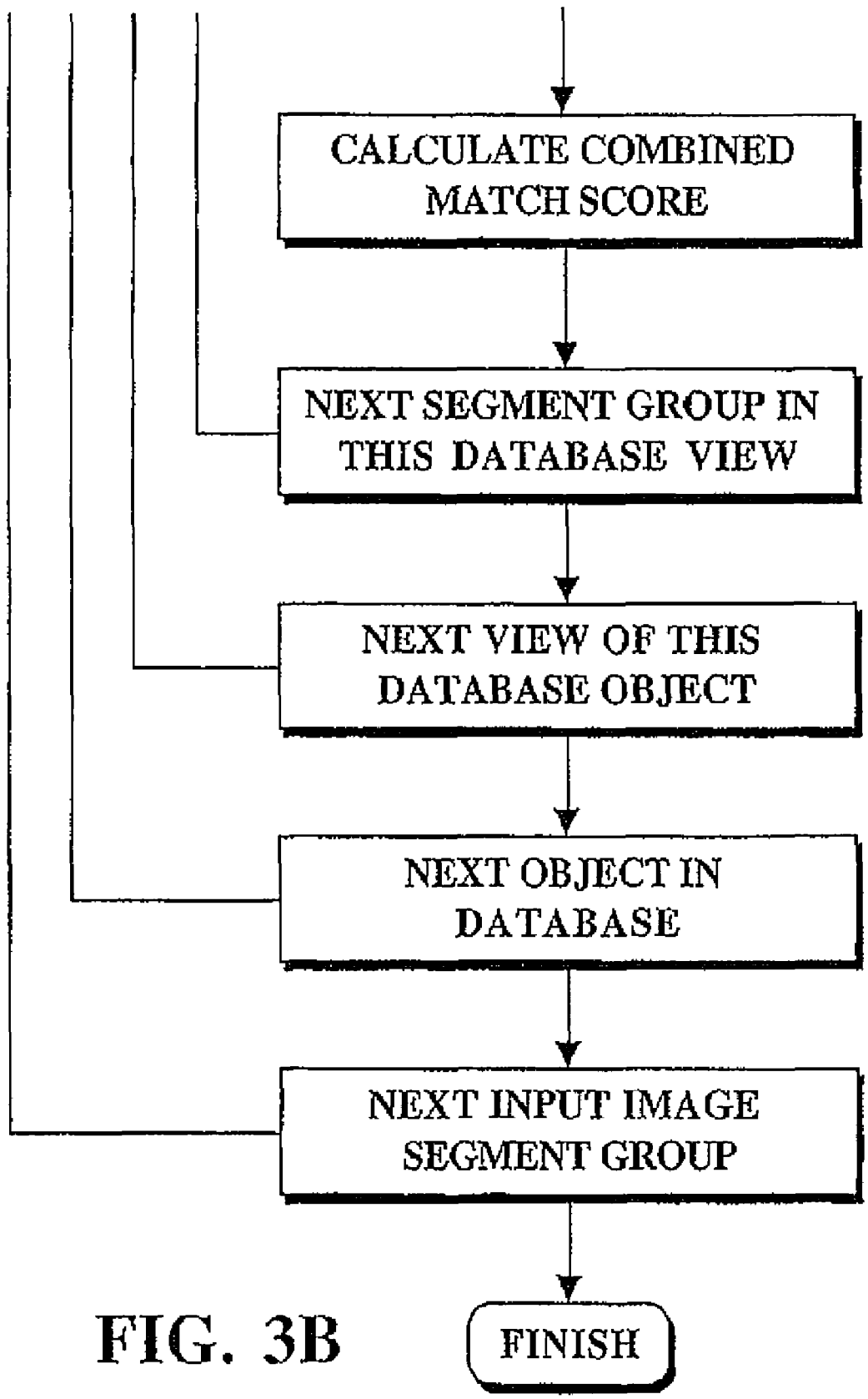

FIGS. 3A and 3B show the process flow within the Database Matching operation. The algorithm is presented here as containing four nested loops with four parallel processes inside the innermost loop. This structure is for presentation and explanation only. The actual implementation, although performing the same operations at the innermost layer, can have a different structure in order to achieve the maximum benefit from processing speed enhancement techniques such as parallel computing and data indexing techniques. It is also important to note that the loop structures can be implemented independently for each inner comparison, rather than the shared approach shown in the FIGS. 3A and 3B.

Preferably, parallel processing is used to divide tasks between multiple CPUs (Central Processing Units), the telephony device 14 and/or computers. The overall algorithm may be divided in several ways, such as:

6 Sharing the In this technique, all CPUs run the entire Outer Loop: algorithm, including the outer loop, but one CPU runs the loop for the first N cycles, another CPU for the second N cycles, all simultaneously. Sharing the In this technique, one CPU performs the Comparisons: loop functions. When the comparisons are performed, they are each passed to a separate CPU to be performed in parallel. Sharing the This technique entails splitting database Database: searches between CPUs, so that each CPU is responsible for searching one section of the database, and the sections are searched in parallel by multiple CPUs. This is, in essence, a form of the "Sharing the Outer Loop" technique described above.

Actual implementations can be some combination of the above techniques that optimizes the process on the available hardware.

Another technique employed to maximize speed is data indexing. This technique involves using a prior knowledge of where data resides to only search in those parts of the database that contain potential matches. Various forms of indexing may be used, such as hash tables, data compartmentalization (i.e., data within certain value ranges are stored in certain locations), data sorting, and database table indexing. An example of such techniques is in the Shape Comparison algorithm (see below). If a database is to be searched for an entry with an Area with a value of A, the algorithm would know which database entries or data areas have this approximate value and would not need to search the entire database.

Thus there has been shown novel identification methods and processes for objects from digitally captured images thereof that uses image characteristics to identify an object from a plurality of objects in a database apparatus and which fulfill all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

What is claimed:

1. A system comprising:
 a camera that captures an image;
 a network-enabled device that conducts a data processing operation on at least a portion of the image to produce data, and sends the data to a service;
 the service programmed to receive the data; identify an object within the image;
  distinguish an object present in the image from others using a database that stores data characteristics of target objects; associate the object with information; and
  return the information to the network-enabled device; and
 the network-enabled device further programmed to present the information related to the object to a user.

2. The system of claim 1, wherein the network-enabled device comprises a mobile phone.

3. The system of claim 1, wherein the service conducts a second data processing operation on at least a portion of the image.

4. The system of claim 1, wherein the service is further programmed to identify the object by applying multiple algorithms to at least a portion of the image or of the data, and identify the object as a function of a confidence levels associated with results of the multiple algorithms.

5. The system of claim 1, wherein the object is not encoded with any data.

6. The system of claim 1, further comprising identifying a bar code or other symbol contained within the image.

7. The system of claim 1, wherein the service is hosted on a computer remote to the network-enabled device.

8. The system of claim 1, wherein the service is further programmed to select the information from among a plurality of information that provides content in a format suitable for display on the network-enabled device.

9. The system of claim 1, wherein the information comprises data that can be utilized to conduct a commercial transaction related to the object.

10. The system of claim 1, wherein the network-enabled device is further programmed to use an address within the information to conduct a commercial transaction related to the object.

11. The system of claim 10, wherein the network-enabled device is further programmed to use at least one of an address and the information to initiate a software process on a remote computer.

12. The system of claim 10, wherein the network-enabled device is further programmed to use at least one of an address and the information to initiate a telephone call.

13. The system of claim 10, wherein the network-enabled device is further programmed to use at least one of an address and of information to initiate a radio communication.

14. The system of claim 10, wherein the network-enabled device is further programmed to use at least one of an address and the information to send data received from the service to a web site.

15. The system of claim 10, wherein the network-enabled device is further programmed to use at least one of an address and the information to display graphics.

16. The system of claim 10, wherein the network-enabled device is further programmed to use at least one of an address and the information to produce an audible sound.

17. The system of claim 10, wherein the distal server is farther programmed to initiate a telephone call from at least one of an address and the information.

18. The system of claim 1, wherein at least one of (a) processing of the data and (b) recognizing objects in the data are divided between the device and the server.

19. The system of claim 1 wherein the image include motion imagery.

20. The system of claim 1 wherein the data processing operation is selected from the group consisting of contrast enhancement, noise removal, and de-blurring.

21. The system of claim 1 wherein the data processing operation is applied to the image prior to identifying the object.

22. The system of claim 1, wherein the object comprises a bar code.

23. The system of claim 1, wherein the at least one of the device and the server are further configured to discriminate among recognizable symbols.

24. The system of claim 23, wherein the at least one of the device and the server are further configured to decode a recognizable symbol.

25. The system of claim 24, wherein the recognizable symbol comprises at least one of the following a barcode, a matrix code, an alphanumeric character.

26. The system of claim 1, wherein the image comprises an image of a magazine.

27. The system of claim 1, wherein the at least one of the device and the server are further configured to produce a grayscale representation of the image.

* * * * *